United States Patent [19]

Minakuchi

[11] 4,278,925
[45] Jul. 14, 1981

[54] PHASE-LOCKED LOOP SPEED CONTROL SYSTEM USING PROGRAMMABLE COUNTER FOR FREQUENCY PULLING

[75] Inventor: Hiroshi Minakuchi, Kadoma, Japan

[73] Assignee: Matsushita Electric Industrial Company, Kadoma, Japan

[21] Appl. No.: 44,149

[22] Filed: May 31, 1979

[30] Foreign Application Priority Data

Dec. 6, 1977 [JP] Japan .................................. 52-146750

[51] Int. Cl.³ .............................................. H02P 5/16
[52] U.S. Cl. .................................... 318/314; 318/318; 331/1 A
[58] Field of Search ............... 318/314, 318, 341, 608, 318/618; 328/155; 331/17, 18, 1 A

[56] References Cited

U.S. PATENT DOCUMENTS

| | | | |
|---|---|---|---|
| 3,458,823 | 7/1969 | Nordahl | 328/155 |
| 3,686,469 | 8/1972 | Clark et al. | 328/155 |
| 3,836,756 | 9/1974 | Yammoto et al. | 318/608 |
| 3,936,710 | 2/1976 | Tanikoshi | 318/318 |
| 4,151,485 | 4/1979 | Lafratta | 331/1 A |

Primary Examiner—David Smith, Jr.
Attorney, Agent, or Firm—Pollock, Vande Sande & Priddy

[57] ABSTRACT

A phase-locked loop system for controlling the speed of a motor or the like comprises an oscillator generating clock pulses or the like comprises a programmable frequency divider receptive of clock pulses for delivery of output pulses at a frequency which is an integral submultiple of the clock frequency, the integral submultiple being variable as a function of external supplied digital signals. A phase comparator compares speed related pulses. A transducer generates pulses at a repetition frequency related to the speed of the motor which is compared in the phase comparator with the output pulse from the frequency divider for driving the motor. A programmable binary counter is provided which is reset in response to the beginning of each period of the speed related pulses for counting the clock pulse. A logic gate circuit is connected to the counter stages of the programmable counter to define a range of pulse counts to generate motor control voltage signals when the count falls outside of the defined range.

7 Claims, 7 Drawing Figures

PHASE-LOCKED LOOP SPEED CONTROL SYSTEM USING PROGRAMMABLE COUNTER FOR FREQUENCY PULLING

BACKGROUND OF THE INVENTION

The present invention relates to systems for controlling the speed of a motor or the like in a phase-locked loop, and in particular to a control circuit for pulling the speed related frequency of the system into a predetermined range of frequencies.

Phase-locked loop controlled motor drive systems are disclosed in U.S. Pat. No. 2,809,339 using vacuum tubes as the constituent circuit elements. Such systems have however been made possible only by the use of a large number of vacuum tubes, which has rendered the system to be impractical until the LSI technology drastically reduced the system cost. The concept of phase-locked loop has consequently found extensive use in many applications including tape recorders and record players, and the like.

The phase-locked loop for controlling the speed of a motor or the like typically comprises an oscillator, a frequency divider coupled to the oscillator to provide an output signal whose frequency is an integral submultiple of the oscillator frequency, a phase comparator for making a comparison in phase between the output of the frequency divider and a signal from a tachogenerator which is mechanically linked to the motor, the latter being driven by a current responsive to the output of the phase comparator through a lowpass filter. The output from the tachogenerator is a signal at a frequency related to the speed of the motor, so that when the generator frequency is tuned to the reference phase signal from the frequency divider the motor is phase-locked to the reference frequency. The system further includes a frequency pull-in control circuit which receives the signal from the generator to detect the deviation of the generator frequency from the reference frequency and derive signals for accelerating or decelerating the motor when the latter is out of the phase-locked state. When the deviation of the motor speed is such that the system is out of the phase-locked state, the pull-in control circuit seizes control of the motor speed in place of the phase comparator in response to the deviation exceeding a predetermined value. The pull-in control circuit is particularly advantageous for improving the transient response characteristic of the system when the motor speed deviates excessively from the reference or overshoots the desired speed value due to its inertia.

The prior art pull-in control circuit comprises monostable multivibrators responsive to the signal from the tachogenerator to generate pulses at the same frequency as the generator frequency. If the generator frequency is low, it is necessary to smooth out the waveform of the output of the output of the monostable by the lowpass filter so that the time constant value of the latter must be of a substantial value. This results in a phase-locked system having a slow response time.

An approach to this problem would involve the use of a sample-and-hold circuit. However, the latter circuit requires a high impedance circuit which makes it difficult to lend itself to circuit integration. In other words, the oscillator, lowpass filter and amplifier of the system constitute an analog circuit element, while the frequency divider and phase comparator function as a digital element, and these different types of circuit elements can be located on a same IC chip only if the latter is constructed of a bipolar IC such as $I^2L$. However, the use of a high impedance element such as field-effect transistors to form the sample-and-hold circuit constitute a barrier to the manufacture of the bipolar IC.

Furthermore, the aforesaid monostable multivibrator and sample-and-hold circuit involves the use of a capacitor to define a time constant with a resistor and such capacitors must be located outside of the IC chip because of the difficulty which the current state-of-the-art IC technology has in achieving this co-mounting, thus resulting in a substantial number of interconnecting leads and terminals between the inside and outside of the IC chip.

In addition to the aforesaid problems, the desirability of changing the motor speed between two or more set speed values as is done with record players in response to changes in oscillator frequency would require that the time constant value of the monostable or sample-and-hold circuit, when used in the pull-in control circuit, be altered in relation to the changing motor speed so that the pull-in threshold point of the system is changed accordingly to ensure smooth transition as the system switches between the phase and frequency control modes. This is only achieved at the expense of added complexity to the pull-in control circuitry.

SUMMARY OF THE INVENTION

The principal object of the invention is to provide a phase-locked motor speed control system which eliminates the aforesaid disadvantages.

According to the invention, the phase-locked system comprises a programmable frequency divider in receipt of clock pulses supplied from an oscillator to deliver an output signal of which the frequency is an integral submultiple of the repetition frequency of clock pulse, the integral submultiple being variable as a function of an externally supplied program control digital signal. The output of the frequency divider is supplied to the phase comparator to serve as reference phase information to drive the motor with the phase differential signal. The motor speed is translated into a train of pulses and supplied to the phase comparator for comparison with the reference phase.

A programmable binary counter is included to count the clock pulses from the oscillator during each interval between successive ones of the motor-speed related pulses. This counter is reset to a digital value corresponding to the variable integral submultiple of the frequency divider in response to the beginning of each repetition cycle of the speed related pulses. A logic gate circuit is connected to the counter stages of the binary counter to generate a first signal when the number of counted clock pulses is smaller than a first digital threshold value which is smaller than the integral submultiple and generate a second signal when the number of counted clock pulses is greater than a second digital threshold value which is greater than the integral submultiple. The first and second digital threshold values correspond to upper and lower limits of the pull-in range of the phase-locked loop, respectively. When the motor speed and hence the generator frequency is higher than the upper limit of the pull-in frequency range, the first signal will be generated to decelerate the motor. When the generator frequency is lower than the lower limit of the pull-in range, the second signal will be generated for accelerating the motor. Once the generator frequency falls within the pull-in range the phase comparator takes control of the phase locking operation.

Since the programmable binary counter is reset to the variable integral submultiple in conjunction with the variation of the reference phase signal, the upper and lower limits of the pull-in range are also varied as a function of the frequency of the reference phase signal, whereby any readjustment of the program control signals to the programmable frequency divider and to the programmable binary counter results in automatic shifting of the upper and lower limits of the pull-in range and consequently the system provides smooth transition as it crosses the critical points.

According to another feature of the invention, the first and second signals generated during the out-of-phase condition are preferably DC voltages of low and high levels, respectively. This eliminates the need to employ an additional filter element which would otherwise be required in the prior art system, so that the time constant value of the phase-locked system is reduced to a minimum with the result that it responds quickly to speed variations of the motor.

Preferably, the system includes means for generating a third signal during the phase-locked state and this signal is used to visually indicate the occurrence of phase-locked condition as soon as the generator frequency enters the pull-in range.

BRIEF DESCRIPTION OF THE DRAWINGS

The invention will be further described by way of example with reference to the accompanying drawings, in which.

DETAILED DESCRIPTION

Figure 1:
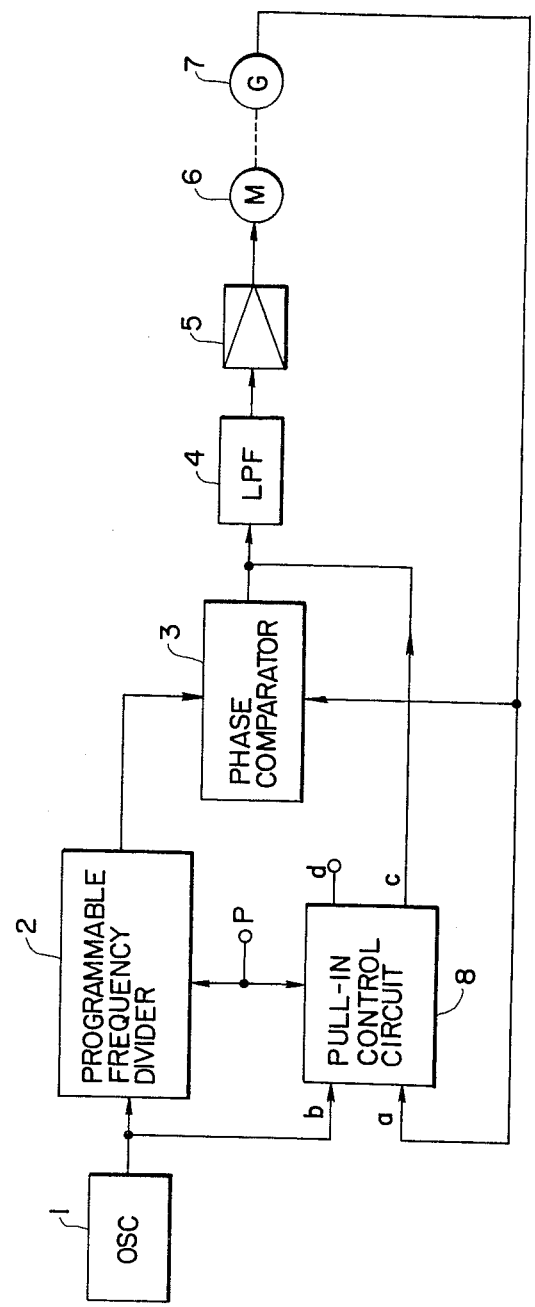
FIG. 1 is a schematic block diagram of a first embodiment of the invention.

A phase-locked loop speed control system of the invention, represented in FIG. 1, comprises a crystal-controlled oscillator 1, programmable frequency divider 2, phase comparator 3, lowpass filter or signal combining means 4, amplifier 5, electric motor 6 or the like, frequency generator or tachogenerator 7, and a frequency pull-in control circuit 8 which is constructed in accordance with the invention. The oscillator 1 provides clock pulses to the programmable frequency divider 2 whose output frequency is an externally variable integral submultiple of the input or oscillator frequency. The integral submultiple is rendered variable in accordance with digital signals applied to the program input terminals indicated by letter P. The output of the frequency divider 2 is applied to a first input terminal of the phase comparator 3 as a reference phase signal for comparison with a signal fed to the second input terminal thereof from the generator 7 which is mechanically linked to the motor 6 for unitary rotation therewith. The output of the phase comparator 3 is an indication of the difference in phase between the two input signals and is useful when the frequency of the generator 7 is at or near the frequency of the reference phase signal, which difference signal is applied to the lowpass filter 4 for driving the motor 6 through the amplifier 5.

The pull-in control circuit 8 establishes an upper and lower frequency limits to determine whether the signal from the tachogenerator 7 is in the range between the frequency limits. This circuit is provided with a first input terminal a connected to the generator 7, a second input terminal b connected to the oscillator 1, and an output terminal e connected to the input of the lowpass filter 4. Also provided is an output terminal d which is left open in this embodiment. The pull-in control circuit is also responsive to the program input signals applied to the terminal P to vary its control range in conjunction with the frequency dividion ratio of the frequency divider 2. This pull-in control circuit has low and high frequency references set by the program input signal and compares the frequency of the signal on the input terminal a with the reference frequencies to detect whether the signal is between the two reference frequencies to permit the output of the phase comparator 3 to lock the system in phase, or whether the signal is lower or higher than the low and high reference frequencies, respectively. If the signal is lower than the low frequency reference, the circuit 8 delivers a high voltage control signal to the motor 6 for acceleration and if the signal is higher than the high frequency reference the control signal reduces to zero for deceleration.

Figure 2:
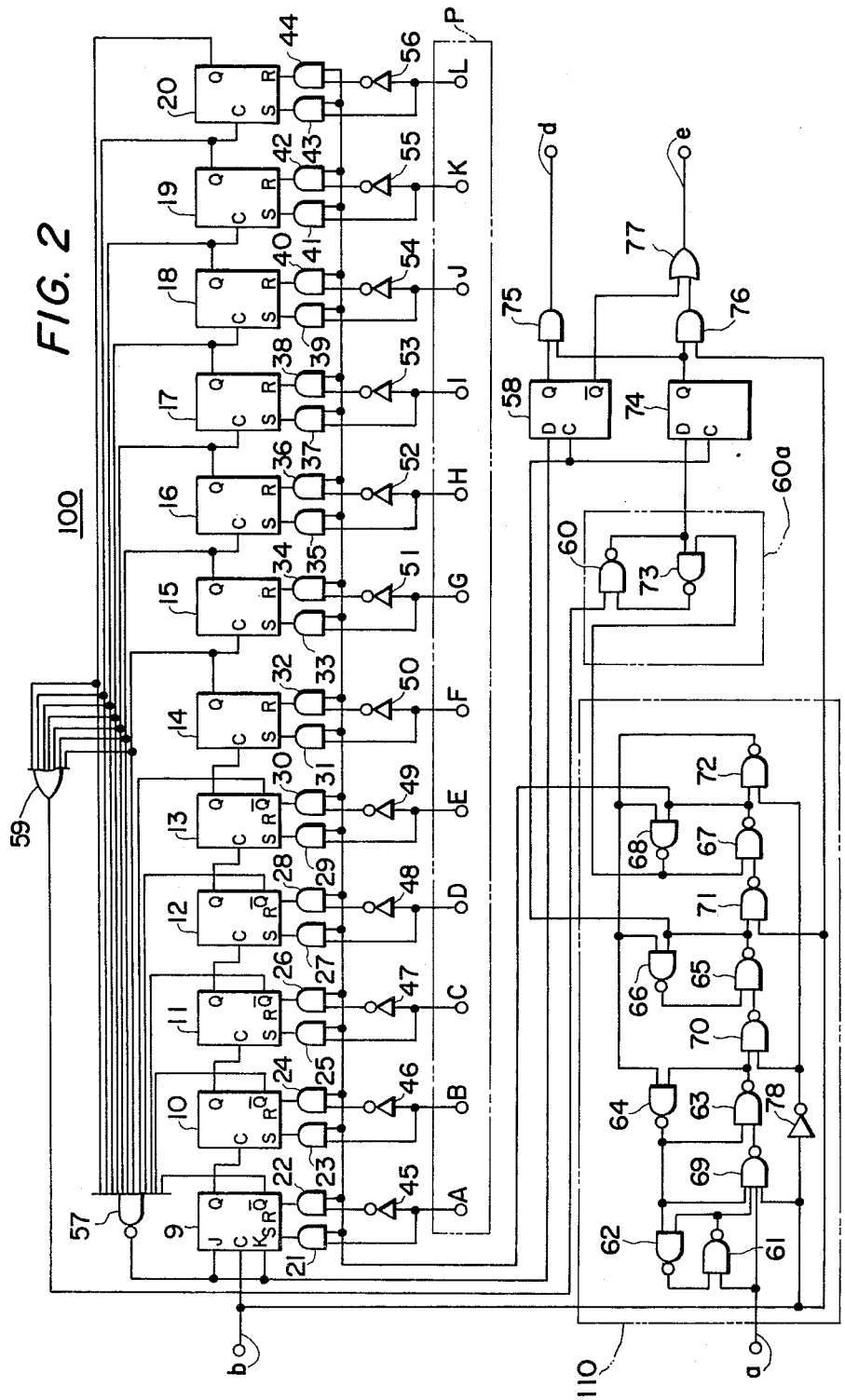
FIG. 2 shows details of the pull-in control circuit of FIG. 1.

FIG. 2 illustrates the details of the circuit 8 of FIG. 1. This circuit comprises generally a 12-bit programmable down-counter 100 comprised by twelve JK flip-flops 9 through 20 successively connected such that each clock input is connected to the Q output terminal of a lower significant bit stage and the least-significant-bit stage 9 is connected to the clock input b. The complementary output terminals of the flip-flops 9 to 13 (the first to fifth LSB stages) are connected to respective input terminals of a NAND gate 57, the true output terminals of the remainder stages being connected to respective terminals of the NAND gate 57 and also to respective input terminals of an OR gate 59. Therefore, the output of the OR gate 59 goes low when the flip-flops 15 to 20 are all in the zero Q output state which occurs when the down-counter reaches a count "000000011111" (which corresponds to 31 in the decimal number system) from the previous high binary count. The NAND gate 57 goes to logical zero when all of its input terminals go to logical "1" in response to the count reaching "111111100000" which corresponds to decimal 4064.

The output of the NAND gate 57 is coupled to the JK inputs of the least significant bit flip-flop 9 and thence to the date input of a D flip-flop 58. The output of the OR gate 59 is connected to an input of a NAND gate 60 which constitutes with another NAND gate 73 a set-reset flip-flop 60a. In response to a logical "1" signal presented at the output of NAND gate 57, the flip-flop 60a switches to logical "1" which is derived from the output of the NAND gate 60 and which is presented to the data input of a D flip-flop 74.

The down-counter 100 is reset to a predetermined value set by the program input binary signals applied to terminals A to L, which are also connected to the corresponding inputs of the programmable frequency divider 2, through set-reset logic gates comprised by AND gates 21 to 44 and inverters 45 to 56. The reset trigger pulse is generated immediately following the positive edge of the generator output applied to the terinal a, which is derived by an edge detector 110 comprised by NAND gates 61 to 72 and an inverter 78. As will be described hereinafter the trigger pulse is derived from the output of NAND gate 67, which is used to enable AND gates 21 to 44 to pass binary program signals from the terminals A to L through the set-reset logic gates to the set and reset terminals of the respective flip-flop stages of the down-counter 100. Therefore, down-count operation is initiated immediately following each of the positive edge of the signal at the input terminal a starting from the reset count value and terminated immediately following the positive edge of a subsequent generator output pulse.

Figure 3:
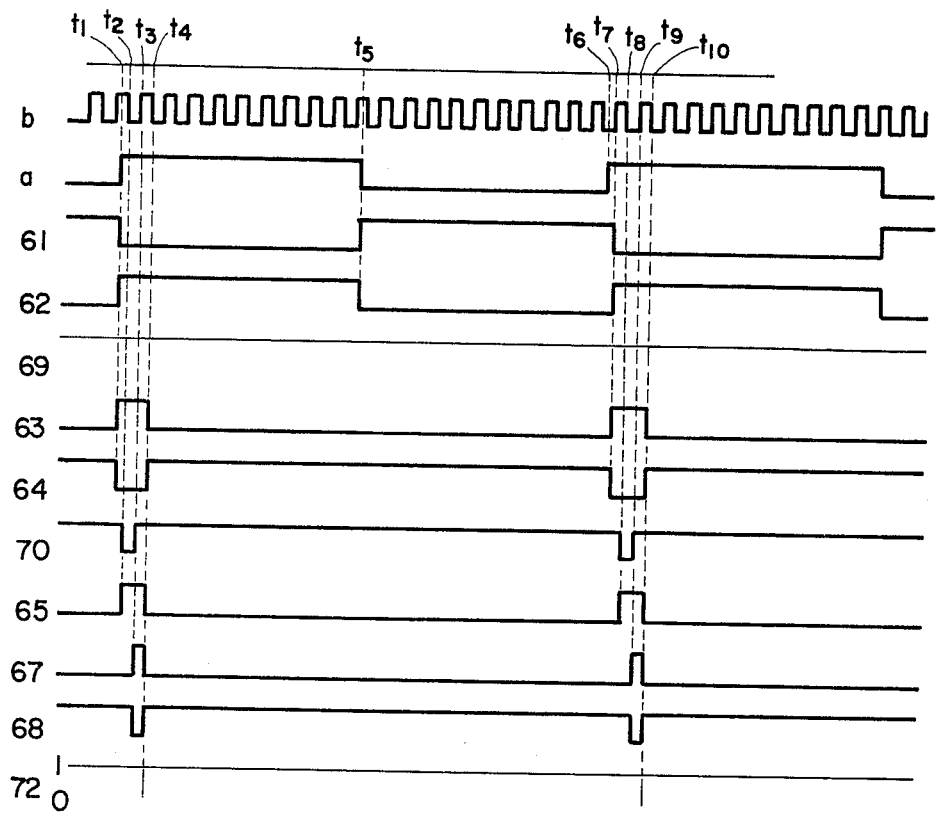
FIG. 3 is a waveform diagram associated with the circuit of FIG. 2.

For a better understanding of the edge detector 110 of FIG. 2, reference is now made to FIG. 3 which illustrates various waveforms generated from the terminals and devices indicated by the corresponding reference letters and numerals which appear at the left of the drawing. At time $t_1$ NAND gate 69 goes to logical "0" in response to the positive edge of a rectangular pulse appearing at the input terminal a in the presence of a logical "1" signal at the terminal b, which causes the NAND gate 63 to switch from logic "0" to "1" and at the same time causes NAND gate 64 to switch from logical "1" to "0". The latter signal results in a logical "1" signal at the output of NAND gate 62 which, presented at an input of NAND gate 61, causes it to return to logical "1". At time $t_2$ NAND gate 70 goes to logical "0" in response to a logical "0" state of the clock input terminal b, causing NAND gate 65 to generate a logical "1" signal which results in a logical "1" signal from the output of NAND gate 66.

At time $t_3$ NAND gate returns to logical "1" level in response to a subsequent clock pulse and at the same time NAND gate 71 goes to logical "0", switching the output state of NAND gate 67 to logical "1", so that NAND gate 68 goes to logical "0". NAND gate 70 also goes to logical "1".

At time $t_4$ the NAND gate 70 again goes to logical "0" by the negative edge of the clock pulse, causing NAND gate 71 to go to logical "1" and subsequently NAND gate 72 to logical "0". The logical "0" output from the NAND gate 72 resets the NAND gates 64, 66 and 68 to logical "1" states, and this results in logical "0" states at the output of NAND gates 63, 65 and 67. Therefore, the counter reset pulse, derived from the NAND gate 67, occurs in synchronism with a clock pulse to permit the down-counter 100 to be ready for accepting subsequent clock pulses during the down-counting operation which starts off from the reset count of 2000 in decimal number.

At time $t_5$ NAND gate 61 goes to logical "1" in response to the negative edge of the pulse on terminal a to cause the NAND gate 62 to return to logical "0" state in readiness for sensing the positive edge of a subsequent pulse on terminal a.

If the positive edge of the subsequent pulse occurs at time $t_6$ at which the logic state of the terminal b is "0," NAND gate 69 does not change its logic state until the terminal b changes to logical "1" at time $t_7$. The circuit actions that will take place subsequently at times $t_8$, $t_9$ and $t_{10}$ correspond respectively to those at times $t_2$, $t_3$ and $t_4$, and the counter 100 is reset subsequently at time $t_9$.

Therefore, the interval between succesive generator output pulses and hence its frequency can be represented by the number of clock pulses counted in the down-counter 100. Assuming that the program input binary state corresponds to a decimal number 2000, the down-counter 100 is reset to the count "011111010000" and from this count value it starts to decrement its value in response to each clock pulse until the next reset pulse is generated. If the count value is smaller than 1969, the first threshold value represented by decimal 31 is not reached and the generator frequency and therefore the motor speed is higher than a higher reference $F_H$ value corresponding to the upper limit of the pull-in range. If the count value is greater than 2031 the second threshold value represented by decimal 4064 is exceeded and the generator frequency is lower than a lower reference value $F_L$ corresponding to the lower limit of the pull-in range. On the other hand, if the count value is between 1969 and 2031, the motor is running at a speed within the pull-in range.

The status of the motor speed is stored in the logic states of the D-type flip-flops 58 and 74 and applied through a logic circuit including AND gates 75 and 76 and an OR gate 77 to the output terminals d and e. When the generator frequency is higher than the higher reference value the output terminals d and e are both at logical "0" to decelerate the motor, and when it is below the lower reference value the output terminals d and e are at logical "0" and "1," respectively, to accelerate the motor. When the generator frequency is between the higher and lower reference values, the AND gate 76 is enabled by the logical "1" output from the D flip-flop 74 to pass the clock signal to the terminal e, and supplied to the lowpass filter 4 to derive a voltage signal which lies between the deceleration and acceleration signal levels. This medium voltage signal is superimposed on the output of the phase comparator 3 and drives the motor 6. Once the generator signal falls within the pull-in range, the phase comparator output seizes control of the motor speed so that the latter is controlled precisely to the center frequency of the pull-in range.

More specifically, when the generator frequency is higher than the higher reference $F_H$, the logic states of OR gate 59 and NAND gate 57 are "1", so that flip-flops 60a and 74 are logical "0", and flip-flop 58 is logical "1". The presence of the logical "0" at the Q output of flip-flop 74 causes AND gate 75 to deliver a logical "0" signal to terminal d and applies a logical "0" signal to terminal e. Therefore, the motor drive signal is at low voltage level and the motor current is reduced to zero. When the motor speed and consequently the generator frequency reduces so that the counter 100 exceeds "000000011111" (decimal 31), the OR gate 59 goes to logical "0" to inhibit the input clock pulse supplied to flip-flop 9, while the NAND gate 57 remains at logical "1" state, so that flip-flop 60a is triggered to produce a logical "1" signal which is applied to D flip-flop 74. D flip-flops 58 and 74 are simultaneously triggered in response to a logical "1" signal derived by the NAND gate 65 at time $t_2$ (FIG. 3) and enables AND gate 75 to provide a logical "1" signal to terminal d and enables AND gate 76 to pass clock pulses to terminal e.

If the generator frequency further reduces so that the counter 100 reaches the count "111111100000" (decimal 4064), NAND gate 57 goes to logical "0", while the OR gate 59 has already been switched to logical "1" before the count reaches that threshold value, so that flip-flop 60a is in the reset condition providing a logical "0" signal to flip-flop 74. In response to a signal from the NAND gate 65, D flip-flops 58 and 74 are triggered to provide logical "0" and "1" signals to AND gate 75 and OR gate 77, respectively, so that the logic states of the output terminals d and e are "0" and "1", respectively. The motor is driven by the high-level current to increase its speed until it rises above the lower frequency reference $F_L$.

It will be understood that if the generator 7 output frequency is controlled to the output frequency $F_S$ of the programmable frequency divider 2 which lies at the center of the pull-in range, the counter 100 reaches all zeros, that is, it counts 2000 clock pulses during each interval between successive ones of the generator output pulses. If the program input value is manually readjusted so as to vary the motor speed, the pull-in control circuit 8 immediately senses that the system is out of the pull-in range and sends a high or low control voltage to the motor 6 depending respectively on whether the pulse interval of the generator signal is longer than the total period of 2031 clock pulses, or whether the pulse interval is shorter than the total period of 1969 clock pulses.

Figure 5:
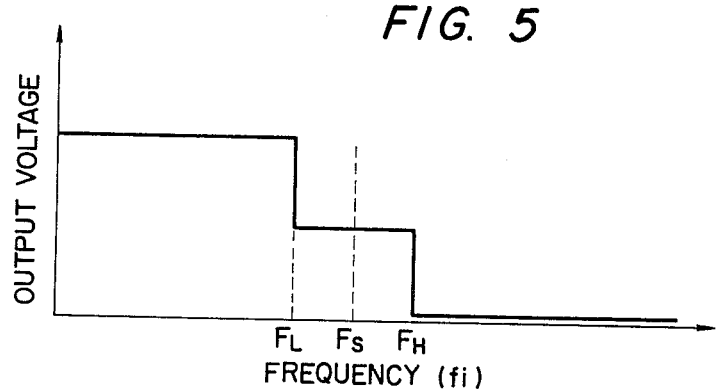
FIG. 5 is a waveform of control signals for the motor.
Figure 6:
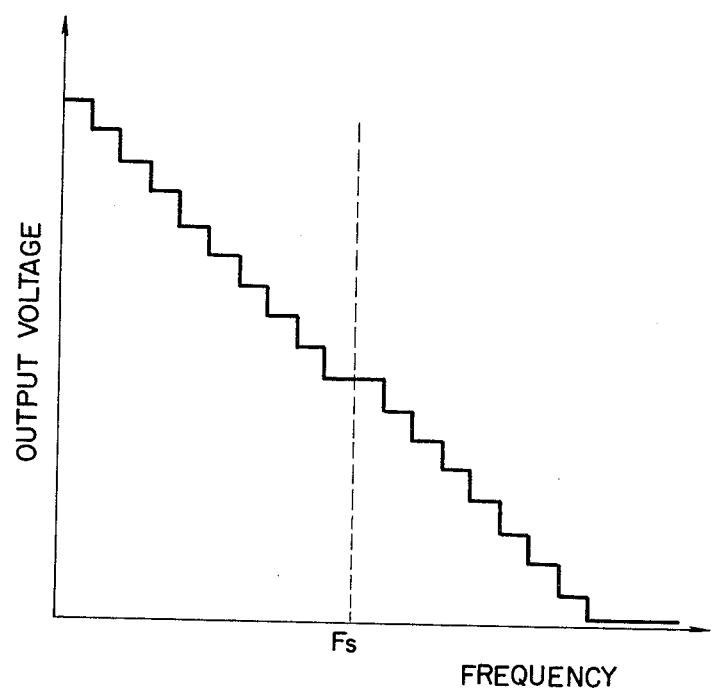
FIG. 6 is a modified waveform of the motor control signal.

As is apparent from the foregoing description that the voltage Vo appearing at the output of the lowpass filter 4 takes on one of three voltage levels as a function of the repetition frequency $f_i$ of the input signal supplied to the terminal a, as illustrated in FIG. 5. A higher voltage resolution could be achieved by the inclusion of a plurality of NAND and OR gates which perform similar functions to those of NAND gate 57 and OR gate 59 so that signals of different voltage levels are generated as the generator frequency approaches the center frequency $F_S$, as illustrated in FIG. 6.

To analyze the frequency pulling capability of the present invention, let P denote the integral submultiple of the frequency divider 2 represented by the binary signals at the terminals A to L, and fc, the frequency of the oscillator 1, the center frequency $F_S$ is given by the following relation:

$$F_S = fc/P \quad (1)$$

and the upper and lower frequency limits, $F_H$ and $F_L$, of the pull-in range are given by the following relations:

$$F_H = fc/(P-a) \quad (2)$$

$$F_L = fc/(P+a) \quad (3)$$

where a is the amount of deviation of frequencies $F_H$ and $F_L$ from the center frequency $F_S$. Then, the frequency bandwidth $F_B$ of the pull-in range is expressed by $$F_B = F_H - F_L = \left( \frac{1}{P-a} - \frac{1}{P+a} \right) fc \quad (4)$$

Since P is much greater than a, Equation 4 can be rewritten as follows:

$$F_B = (2a/P^2) fc \quad (5)$$

The ratio of bandwidth $F_B$ to the center frequency $F_S$ is obtained as follows:

$$(F_B/F_S = 2a/P) \quad (6)$$

Since P and a are 2000 and 31, respectively, in the present embodiment, the ratio $F_B/F_S$ is $3.1 \times 10^{-2}$. Thus, the motor acceleration and deceleration signals are generated when the generator frequency is about 1.6% lower or higher than the center frequency $F_S$.

Figure 4:
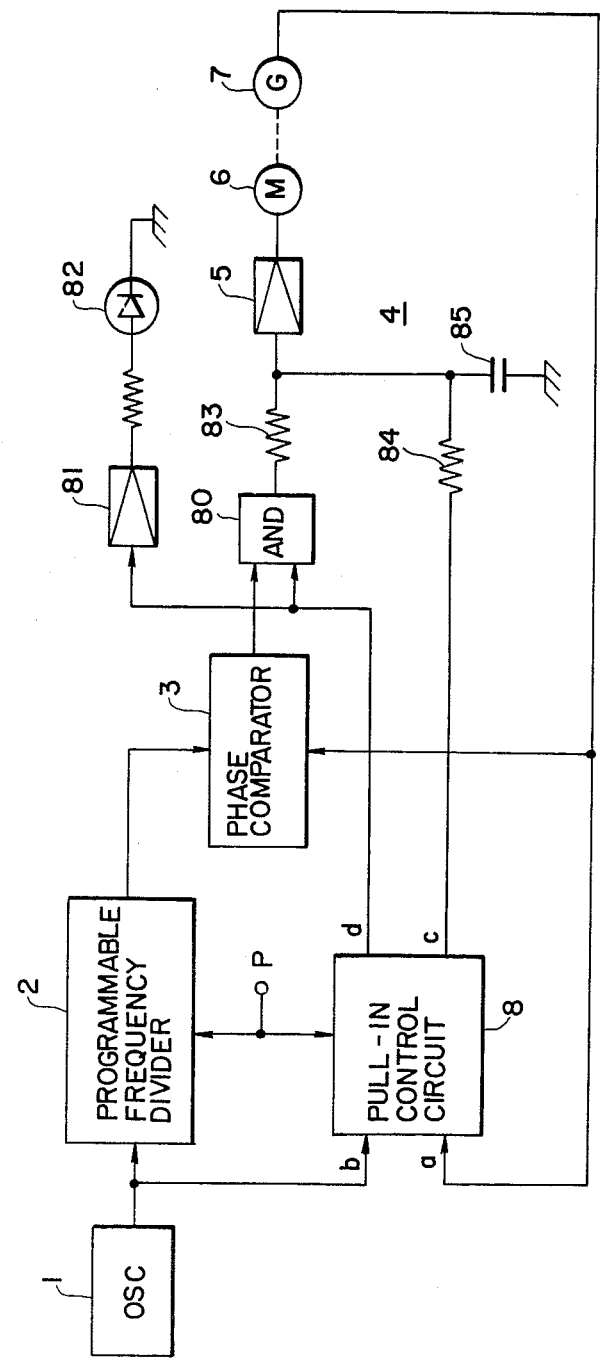
FIG. 4 is a schematic block diagram of a second embodiment of the invention.

The embodiment of FIG. 1 is modified as shown in FIG. 4 to take full advantage of signals which appear at the output terminal d of the pull-in control circuit 8 of FIG. 2. The circuit of FIG. 4 differs from the FIG. 1 embodiment by the inclusion of an AND gate 80 and pull-in indicator circuit including an amplifier 81 and a light-emitting diode 82. The lowpass filter 4 comprises resistors 83, 84 and a capacitor 85 coupled between the junction of the resistors 83 and 84 and ground. The output of the phase comparator 3 is connected to an input of the AND gate 80 which receives as its other input from the terminal d of the pull-in control circuit 8. As previously described, the terminal d is at logical "1" when the generator frequency is in the pull-in range, the AND gate 80 is enabled during this pull-in period to pass the comparator 3 output to the lowpass filter 4 through resistor 83 to develop an analog voltage across the capacitor 85 which is coupled to the motor 6 via the amplifier 5. The logical "1" signal from the terminal d is also applied to the indicator amplifier 81 to visually indicate that the system is in a phase-locked condition.

When the system is out of the pull-in range of the circuit 8, the AND gate 80 is disabled, and signals from the terminal e are applied through the resistor 84 to the amplifier 5 instead of the signal from the phase comparator 3.

It is known that due to the presence of the signal from the phase comparator 3 the motor 6 tends to overshoot and falls outside the pull-in range again when the system is about to enter the pull-in frequency range. This overshooting problem can be substantially eliminated in the embodiment of FIG. 4 by the exclusive application of the motor control signal from the pull-in control circuit 8 until the generator frequency reaches the lower limit of the pull-in range and the exclusive application of the phase comparator signal once the system enters the pull-in range. This is particularly advantageous when the program input command is varied to increase the motor speed to a higher setting point.

Figure 7:
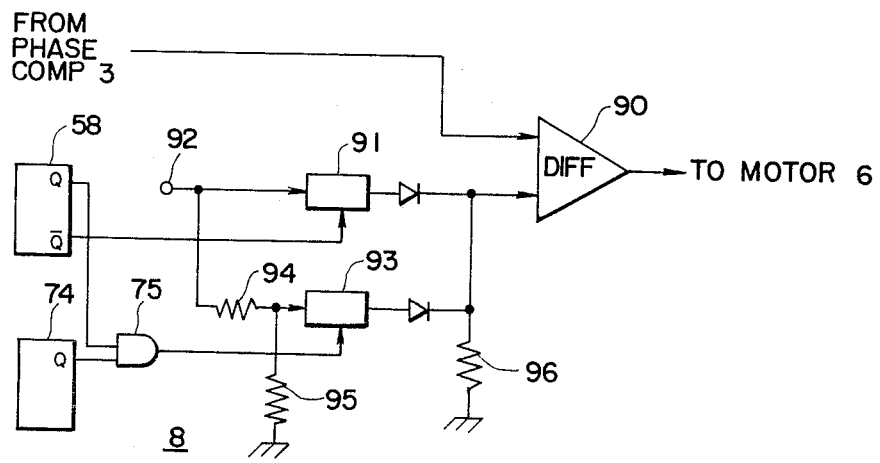
FIG. 7 is a schematic circuit diagram of a third embodiment of the invention.

A further modification of the FIG. 1 embodiment is illustrated in FIG. 7 in which the output from the phase comparator 3 is coupled to an input of a differential amplifier 90 where it is combined with output signals from the pull-in control circuit 8. The pull-in control circuit is modified to include a transmission gate 91 which applies a high voltage from a voltage supply terminal 92 to another input of the differential amplifier 90 in response to a logical "1" signal from the complementary output of the D flip-flop 58 which occurs when the generator frequency is lower than the lower frequency limit $F_L$. A second transmission gate 93 is provided when applies a medium level voltage supplied from a voltage divider formed by resistors 94 and 95 to the differential amplifier in response to a logical "1" signal from the AND gate 75 which occurs when the system is in the phase-locked condition. When the generator frequency is higher than the higher frequency limit $F_H$, both transmission gates are disabled and a low voltage is supplied to the differential amplifier 90 through a resistor 96. This eliminates the need to provide a lowpass filter to the output of the pull-in control circuit 8.

What is claimed is:

1. A phase-locked loop system for controlling the speed of an electrically driven moving element, comprising:
   means for generating a train of pulses at a frequency related to the speed of said moving element;
   an oscillator for generating clock pulses;
   a programmable frequency divider having a clock input terminal connected to said oscillator and a program control input terminal receptive of a program control signal for generating an output signal at a frequency which is an integral submultiple of the frequency of said oscillator in response to said program control signal;
   a phase comparator having a first input terminal connected to the output of said programmable frequency divider and a second input terminal receptive of said speed related pulses;
   a lowpass filter connected to the output of said phase comparator;
   a pull-in control circuit comprising a programmable counter having a clock input terminal connected to said oscillator for counting said clock pulses and a program control input terminal receptive of said program control signal, said pull-in control circuit being responsive to said speed related pulses for generating an output signal such that the output signal of said lowpass filter varies as a function of the frequency of said speed related pulses; and
   means for combining said output signal of said pull-in control circuit with the output signal from said phase comparator and applying a combined output signal through said lowpass filter to said moving element.

2. A phase-locked loop system as claimed in claim 1, wherein said programmable counter is resettable to a set of first and second program input values, the first program input value being smaller than said variable integral submultiple and said second program value being greater than said variable integral submultiple, said programmable counter generating a first signal when the count value of said clock pulses is smaller than said first program input value and a second signal when said count value is greater than said second program input value.

3. A phase-locked loop system as claimed in claim 1, wherein said pull-in control circuit comprises:
   first and second gate circuits connected to the counter stages of said programmable counter to generate first and second logic signals in response to the count value of said programmable counter reaching said first and second program input values, respectively;
   means for detecting an edge of said speed related pulses; and
   first and second memory devices operable to change their logic states in response to the detected edge of said speed related pulses in accordance with the logic state of said first and second logic signals, respectively.

4. A phase-locked loop system as claimed in claim 2, further comprising means for generating a third signal when the count value of said clock pulses is between said first and second program input values and applying said third signal to said combining means with said first and second signals.

5. A phase-locked loop system as claimed in claim 2, wherein said pull-in control circuit comprises means for supplying said clock pulses to said lowpass filter when the number of said clock pulses counted by said programmable counter is between said first and second program input values.

6. A phase-locked loop system as claimed in claim 4, further comprising a gate circuit for applying the output of said phase comparator to said lowpass filter exclusively when the count value of said clock pulses is between said first and second program input values.

7. A phase-locked loop system as claimed in claim 4, wherein said combining means comprises a differential amplifier having a first input terminal connected to the output of said phase comparator and a second input terminal connected to be responsive to said first, second and third signals, and means for applying an output signal from said differential amplifier being applied to said motor.

* * * * *